UNITED STATES PATENT OFFICE.

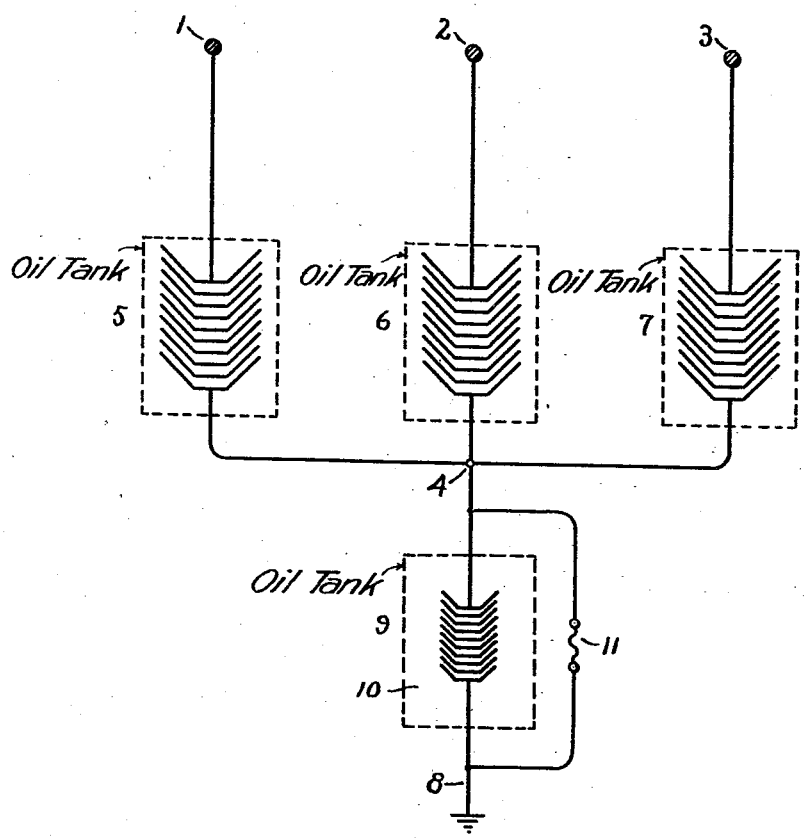

ELMER E. F. CREIGHTON, OF SCHENECTADY, NEW YORK, ASSIGNOR TO GENERAL ELECTRIC COMPANY, A CORPORATION OF NEW YORK.

GROUND-LEG CONNECTION FOR ELECTROLYTIC ARRESTERS.

No. 923,338.　　　　Specification of Letters Patent.　　　　Patented June 1, 1909.

Application filed July 9, 1907. Serial No. 382,860.

*To all whom it may concern:*

Be it known that I, ELMER E. F. CREIGHTON, a citizen of the United States, residing at Schenectady, county of Schenectady, State of New York, have invented certain new and useful Improvements in Ground-Leg Connections for Electrolytic Arresters, of which the following is a specification.

This invention relates to devices for protecting high voltage alternating current transmission lines from the destructive effects of abnormally high potential charges. What is known as the multiplex connection has been heretofore proposed for this purpose, a lightning arrester being located in a phase-leg between each line conductor and the neutral point of the system, and another arrester in a ground-leg from neutral to earth; so that if any conductor becomes accidentally grounded there will still be the same number of arresters between line and line as under normal conditions. This ground-leg arrester is in the nature of an emergency device, and is not subjected to the ordinary line voltage. It is called into play only when an abnormally high potential is impressed on the system. In applying aluminum cell or other electrolytic condenser lightning arresters to this multiplex connection system, the cell in the ground-leg is not ordinarily in condition to limit a flow of current, owing to the fact that a cell of this type loses its resisting film when inactive. When brought into service by a ground on one of the lines, this cell requires a brief space of time to become fully operative by the re-forming of its film. The phase-leg cells are not ordinarily designed to take care of an excess of dynamo potential for a long period, and in order to prevent their overheating by the passage of dynamic current or rapidly recurring surges of high potential current it is highly desirable to provide for a quick re-formation of the film in the auxiliary ground-leg cell. Other things being equal, the rapidity of re-formation of the film varies inversely with the area of the plates and directly with the current.

The present invention consists, therefore, in providing the ground-leg arrester with smaller plates than those in the phase leg. When a ground occurs on any one of the line conductors, the current which flows through the cells has a relatively high value, owing to the large plates in the phase leg and the sudden increase of voltage due to the ground. The cell in the ground leg offers practically no resistance, owing to the weakened condition of its film. The cells in both the phase-leg and the ground leg may be damaged unless the current is quickly brought to a lower value than the initial dynamic rush. By using smaller plates in the ground-leg cell, this result is accomplished within a safe limit of time.

The accompanying drawing is a diagrammatic representation of the application of my invention to a three-phase transmission system.

The three line conductors 1, 2, 3 are connected to the neutral point 4 by three phase legs, each containing an electrolytic condenser, 5, 6, 7. Each condenser has sufficient capacity to hold back the normal line voltage, while permitting a leakage of small static charges to ground through the ground leg 8, connected with all the condensers at the neutral point of the system. The ground-leg contains an auxiliary condenser 9, whose plates are considerably smaller than those in the main condensers, but the same in number. These plates are immersed in an oil tank 10 preferably of substantially the same size as those containing the main condensers, so as to gain the advantage of the quicker cooling effect of the relatively greater volume of oil. As no current flows normally through the ground-leg, the films in the cell 9 will be weakened and will offer but little resistance to the passage of small static charges to earth. If desired, a fuse 11 may be shunted about the cell 9 to shorten the circuit from neutral to ground under normal conditions of lightning discharge from lines to earth; but this is not an essential feature of the invention. In case of a ground on any one of the line conductors, the main condenser connected therewith is short circuited, and the auxiliary condenser is brought into service. The small plates of this condenser enable the higher potential and increased current to re-form the films very quickly, so that the current-limiting effect of the cell is speedily exerted and the dangerous current is suppressed.

What I claim as new and desire to secure by Letters Patent of the United States, is,

1. The combination with the line conductors of a transmission system, of an electrolytic condenser in each phase leg of the multiplex connection, and an auxiliary condenser of smaller capacity in the ground leg of said connection.

2. The combination with the line conductors of a transmission system, of electrolytic condensers connected respectively to each conductor and to a common neutral, a common ground connection from said neutral, and an electrolytic condenser in said ground connection having smaller plates than those in the other condensers.

3. The combination with the line conductors of a transmission system, of main electrolytic condensers connected respectively to said conductor and to a common neutral, a common ground connection from said neutral, and an auxiliary electrolytic condenser in said ground connection which requires a less amount of energy than the main condenser to reform its resisting film.

In witness whereof, I have hereunto set my hand this 3rd day of July, 1907.

ELMER E. F. CREIGHTON.

Witnesses:
BENJAMIN B. HULL,
HELEN ORFORD.